(12) United States Patent
Itou et al.

(10) Patent No.: US 11,415,134 B2
(45) Date of Patent: Aug. 16, 2022

(54) SCREW ROTOR, FLUID MACHINE MAIN BODY, AND FLUID MACHINE

(71) Applicant: Hitachi Industrial Equipment Systems Co., Ltd., Tokyo (JP)

(72) Inventors: Yuuji Itou, Tokyo (JP); Tomoo Suzuki, Tokyo (JP); Masayuki Kasahara, Tokyo (JP); Hiroshi Horiuchi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 16/981,128

(22) PCT Filed: Mar. 14, 2019

(86) PCT No.: PCT/JP2019/010464
§ 371 (c)(1),
(2) Date: Sep. 15, 2020

(87) PCT Pub. No.: WO2019/188322
PCT Pub. Date: Oct. 3, 2019

(65) Prior Publication Data
US 2021/0017986 A1  Jan. 21, 2021

(30) Foreign Application Priority Data

Mar. 30, 2018 (JP) .............................. JP2018-066555

(51) Int. Cl.
*F04C 18/16* (2006.01)
*B33Y 80/00* (2015.01)
(Continued)

(52) U.S. Cl.
CPC .............. *F04C 18/16* (2013.01); *B33Y 80/00* (2014.12); *F01C 1/16* (2013.01); *F01C 21/06* (2013.01);
(Continued)

(58) Field of Classification Search
CPC ............ F04C 2/16–20; F04C 18/16–20; F01C 1/16–20
See application file for complete search history.

(56) References Cited

U.S. PATENT DOCUMENTS

| 5,290,150 A | 3/1994 | Takahashi et al. |
| 2001/0031213 A1* | 10/2001 | Liu .......................... F01C 1/16 418/77 |

(Continued)

FOREIGN PATENT DOCUMENTS

| DE | 20023087 U1 * | 11/2002 | .............. F04C 18/16 |
| GB | 523741 A * | 7/1940 | .............. F04C 18/16 |

(Continued)

OTHER PUBLICATIONS

International Search Report (PCT/ISA/210) issued in PCT Application No. PCT/JP2019/010464 dated Jul. 2, 2019 with English translation (four (4) pages).

(Continued)

Primary Examiner — Laert Dounis
(74) Attorney, Agent, or Firm — Crowell & Moring LLP

(57) ABSTRACT

The invention prevents a decrease in strength of a screw rotor including a hollow portion and improves cooling performance. There is provided a screw rotor having a helical tooth on an outer periphery, the helical tooth extending by a predetermined length in an axial direction, in which a radial cross section of the screw rotor includes a cross section of a tooth portion, a cross section of an axial portion, a cross section of a support portion connected to an axial side of a tooth bottom or a tooth tip in the cross section of the tooth portion and an outer diameter side of the axial portion, and a cross section of a hollow portion formed by the support portions adjacent to each other in a rotational direction and an axial side inner surface of the tooth bottom or the tooth tip, and an axial longitudinal cross section of the (Continued)

screw rotor is a cross section in which the axial portion, the support portion, the axial side of the tooth bottom or the tooth tip, and an axial end portion of the screw rotor are continuously connected to each other as an integral structure by a three-dimensional fabrication method or the like.

19 Claims, 5 Drawing Sheets

(51) Int. Cl.
*F01C 1/16* (2006.01)
*F01C 21/06* (2006.01)
*F04C 2/16* (2006.01)
*F04C 29/04* (2006.01)

(52) U.S. Cl.
CPC .............. *F04C 2/16* (2013.01); *F04C 29/04* (2013.01); *F04C 2230/20* (2013.01); *F04C 2240/20* (2013.01); *F04C 2240/603* (2013.01); *F04C 2250/20* (2013.01)

(56) References Cited

U.S. PATENT DOCUMENTS

2016/0123327 A1  5/2016  Collins et al.
2017/0058901 A1* 3/2017  Collins ................ F04C 29/04

FOREIGN PATENT DOCUMENTS

| JP | 57-70985 A | 5/1982 |
| JP | 5-195701 A | 8/1993 |
| JP | 8-261183 A | 10/1996 |
| JP | 8-284856 A | 10/1996 |
| JP | 2006-214366 A | 8/2006 |
| WO | WO 2019/073679 A1 | 4/2019 |

OTHER PUBLICATIONS

Japanese-language Written Opinion (PCT/ISA/237) issued in PCT Application No. PCT/JP2019/010464 dated Jul. 2, 2019 with English translation (nine (9) pages).

* cited by examiner

SCREW ROTOR, FLUID MACHINE MAIN BODY, AND FLUID MACHINE

TECHNICAL FIELD

The present invention relates to a screw rotor, a fluid machine main body, and a fluid machine, particularly to a screw rotor including a hollow portion, a fluid machine main body, and a fluid machine.

BACKGROUND ART

There is known screw fluid machines such as a screw compressor that compresses intake gas to generate compressed gas, a screw pump that transports intake liquid under pressure, and a screw expander that causes inflowing compressed gas to expand to generate a rotational force.

For example, regarding the compressor, there is known positive displacement screw compressors such as a single screw compressor, a twin screw compressor, a triple (multiple) screw compressor, and the like in which the teeth and the grooves of a plurality of rotating screw rotors mesh with each other to reduce the volumes of compression working chambers to thereby discharge compressed gas (in the single screw compressor, a male or female rotor may be referred to as a gate rotor). In addition, there is known various types of screw compressors such as a liquid-feed compressor that supplies liquid such as water or oil to compression working chambers to compress intake gas, and a liquid-free compressor that performs compression without having a supply of liquid.

In the related art, regarding the structure of a screw rotor, a technique of providing a hollow portion inside the rotor is disclosed. For example, in order to reduce the complexity or the man-hour of a production method by which the teeth and the grooves of a screw rotor are machined by cutting or grinding from the outside, Patent Document 1 discloses a method for obtaining a screw rotor, by which a non-machined member including a lobe member having a smaller outer diameter than the diameter of an inner diameter surface of a mold and having a cylindrical hollow inside and a rotor shaft penetrating through the center of the lobe member in an axial direction is inserted into the mold which has a cylindrical shape and of which the inner diameter surface has the helical shape of an outer surface of the screw rotor, and then high-pressure gas is to be sealed in a hollow portion via a shaft hole penetrating through the center of the rotor shaft in the axial direction and a through-hole that penetrates therethrough in radial direction so as for the shaft hole and the hollow portion of the lobe member to communicate with each other, and thus an outer periphery of the lobe member is pressed against the inner diameter surface of the mold, so that the inside is hollow and the outer periphery has a helical shape.

In addition, in order to further reduce the mass of the hollow screw rotor disclosed in Patent Document 1, Patent Document 2 discloses a hollow screw rotor in which a shaft portion penetrating through a screw portion is not provided.

In addition, Patent Document 3 discloses a screw rotor that includes a hollow portion and is formed by stacking a plurality of steel plates in an axial direction. This document discloses that the steel plates each have a shape rotated by a predetermined angle around an axis and are sequentially stacked to obtain a screw rotor having a helical outer shape. Then, it is disclosed that the inside of a portion of each steel plate, the portion being equivalent to a screw tooth, is punched out to obtain the steel plate having an opening portion and the processed steel plates are stacked, so that the opening portions form a hollow portion having a helical shape.

In addition, in a screw rotor disclosed in Patent Documents 4 and 5, similar to Patent Document 1, the inside of a cylindrical member that is hollow thereinside is subjected to fluid pressure to be pressed against a mold having an inner wall with a helical shape to thereby obtain a helical portion of a tooth of the screw rotor, and then a hollow boss penetrating through the axis of the helical portion, which is hollow, in an axial direction is inserted. Then, an outer periphery of the hollow boss is in contact with and fixed to the tooth of a hollow portion of the screw rotor (hollow portion side of a tooth bottom), so that the strength of the screw rotor including the hollow portion is secured.

CITATION LIST

Patent Document

Patent Document 1: JP 57-70985 A
Patent Document 2: JP 2006-214366 A
Patent Document 3: JP 5-195701 A
Patent Document 4: JP 8-261183 A
Patent Document 5: JP 8-284856 A

SUMMARY OF THE INVENTION

Problems to be Solved by the Invention

By the way, when the screw fluid machine is a compressor, compression heat is generated by compression work of gas to cause compressed discharge gas, which is discharged from a compressor main body, to become high temperature, and when the screw fluid machine is an expander, expansion heat is generated by expansion work of gas to cause expanded discharge gas, which is discharged from the compressor main body, to become low temperature. Namely, it is required to take account of heat associated with a pressure fluctuation such as compression or expansion occurring in a working chamber.

For example, in a liquid-free screw compressor, a male rotor and a female rotor are structured with a narrow gap therebetween to mesh with each other in a non-contact manner to compress gas, but unlike a liquid-feed type, a medium exchanging heat with the gas is not present in a working chamber, and thus compression heat tends to has a higher temperature (approximately 300 to 350° C. in a single-stage compressor and approximately 160 to 250° C. in a multi-stage compressor) than in the liquid-feed type. Since the compression heat causes thermal expansion of the rotor or a compressor main body casing that stores the rotor, in terms of maintenance, it is preferable that contact between the teeth of the rotors caused by the thermal expansion is avoided. As one example, in the compressor main body casing, a flow path of a cooling medium (water, coolant, oil, or the like) may be provided or a gap may be secured while taking account of thermal expansion in advance. Furthermore, since compressed discharge gas also is high temperature, generally, in many cases, a cooler that cools the compressed discharge gas is provided.

In addition, the liquid-feed screw compressor tends to become lower in temperature than the liquid-free type, but the temperature of compressed discharge gas may be approximately 100° C. to 120° C., and in many cases, a compressor main body casing may be provided with a flow path through which the cooling medium flows to cool a compressor main body, or a cooler for the compressed discharge gas may be provided.

The hollow rotor disclosed in each of the above patent documents contributes to a reduction in mass of the rotor and the like, and can be expected to have effects such as a reduction in driving energy, a reduction in weight, and a reduction in material cost; however, on the other hand, the hollow rotor has a relatively higher thermal effect compared to a solid rotor, which is a problem. For example, in the hollow rotor, the strength is relatively decreased, the thermal expansion effect is increased, or the cooling performance of compressed gas is decreased, which is a problem.

Such a thermal effect is a problem that is also applicable to an expander. For example, when high-pressure gas supplied to a working chamber is high temperature, it is required to take account of the heat resistance of a rotor against the heat or pressure. On the contrary, when the expansion heat has low temperature, it can be said that it is required to take account of thermal shrinkage of the rotor.

A technique of maintaining and improving the performance of the screw fluid machine while enjoying the advantages of the hollow rotor is desired.

Solutions to Problems

In order to solve the above problems, for example, the configurations described in the claims are applied. Namely, there is provided a screw rotor having a helical tooth on an outer periphery, the helical tooth extending by a predetermined length in an axial direction, in which a radial cross section of the screw rotor includes a cross section of a tooth portion, a cross section of an axial portion, a cross section of a support portion connected to an axial side of a tooth bottom or a tooth tip in the cross section of the tooth portion and an outer diameter side of the axial portion, and a cross section of a hollow portion formed by the support portions adjacent to each other in a rotational direction and an axial side inner surface of the tooth bottom or the tooth tip, and an axial longitudinal cross section of the screw rotor is a cross section in which the axial portion, the support portion, the axial side of the tooth bottom or the tooth tip, and an axial end portion of the screw rotor are continuously connected to each other as an integral structure.

Effects of the Invention

According to the invention, the performance of the hollow rotor against heat or pressure can be improved. Other problems, configurations, and effects of the invention will be apparent from the following description.

MODE FOR CARRYING OUT THE INVENTION

Hereinafter, modes for carrying out the invention will be described with reference to the drawings.

First Embodiment

Figure 1A:
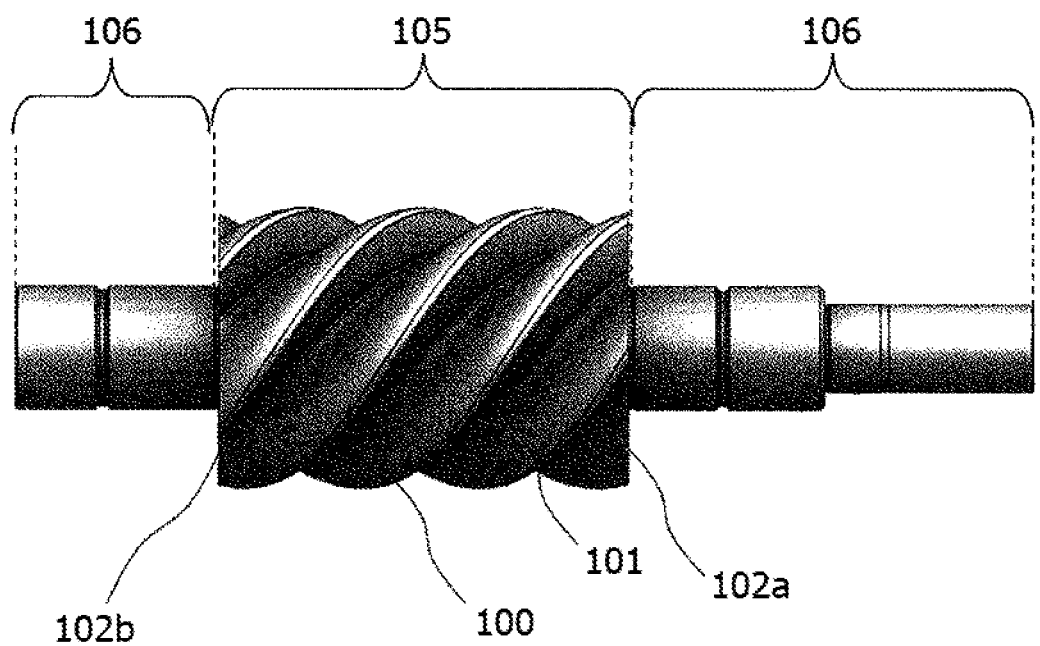
FIGS. 1A and 1B are axial lateral views illustrating a configuration of a screw rotor according to a first embodiment to which the invention is applied.
Figure 1B:
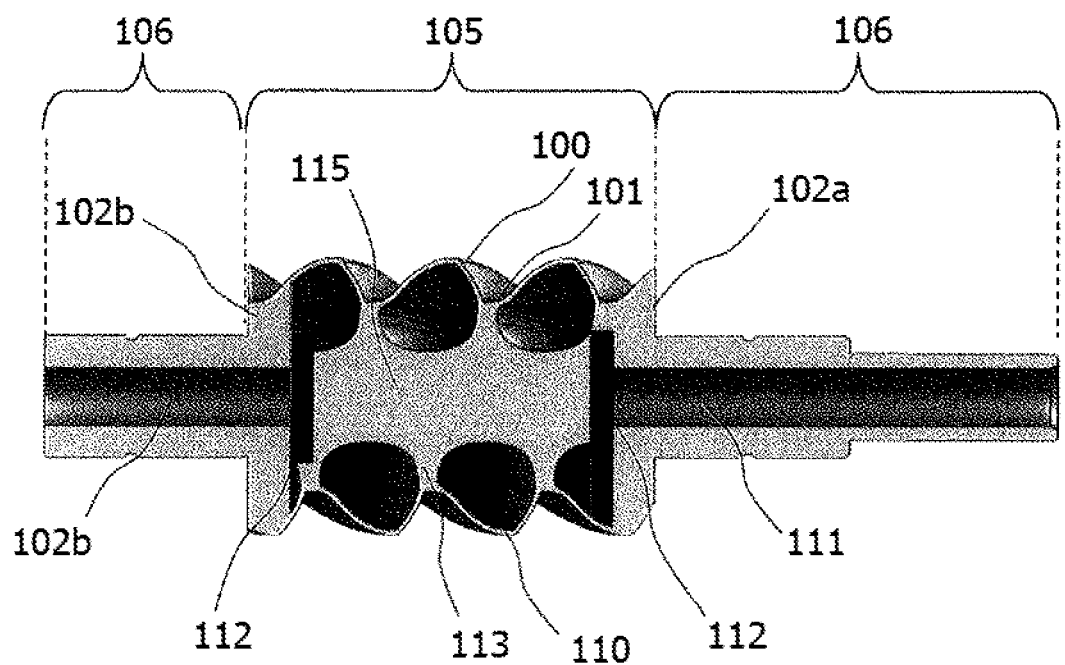

FIG. 1 schematically illustrates a configuration of a screw rotor in a first embodiment to which the invention is applied. FIG. 1(a) illustrates an axial lateral appearance of a male screw rotor 27, and FIG. 1(b) illustrates an axial longitudinal cross section of the male screw rotor 27. Incidentally, in the present embodiment, a male rotor of a twin screw rotor in which male and female rotors are paired has been provided as an example; however, the invention is also applicable to a female rotor.

In FIG. 1(a), the male screw rotor 27 mainly includes a screw portion 105, which includes a tooth portion 100 and a groove portion 101 that have a helical radial outer periphery and end portions 102a and 102b on both sides in an axial direction, and a shaft portion 106 disposed at the centers of axial end portions of the screw portion 105.

The tooth portion 100 and the groove portion 101 mesh with a tooth groove portion of a female screw rotor 28 to be described later in a contact or non-contact manner, and a compression working chamber is formed by an inner wall of a bore of a casing main body 33a that stores the male screw rotor 27 and the female screw rotor. The male screw rotor 27 and the female screw rotor 28 rotate to cause the volume of the compression working chamber to be contracted to thereby discharge gas, which is suctioned from an intake side, as compressed gas.

The shaft portion 106 is disposed at the centers of the axial end portions of the screw portion 105. The shaft portion 106 receives rotational power from an electric motor 8 which is a drive source to be described later, to rotate the screw rotor.

In FIG. 1(b), the male screw rotor 27 includes a hollow portion 110 having a helical shape, a through-portion 111, and a communication portion 112 thereinside.

The hollow portion 110 is a cavity that forms a hollow portion in substantially the entirety of the screw portion 105 along the shape of the tooth groove. In the present embodiment, the hollow portion 110 is provided for each tooth. The through-portion 111 is a flow path that penetrates through the center of the shaft portion 106 in the axial direction to transport a fluid to be described later to the screw portion 105. The communication portion 112 is a communication portion that allows the fluid to flow between both trailing ends in the axial direction of the hollow portion 110 and the through-portion 111.

Figure 2:
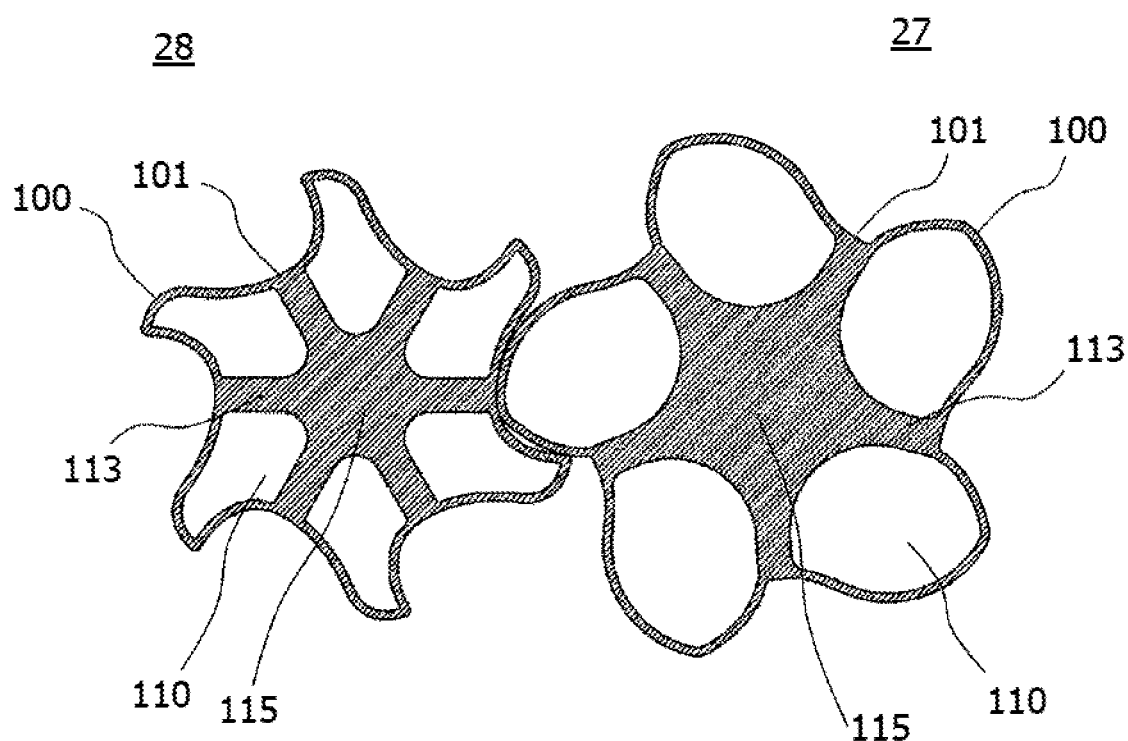
FIG. 2 is a view schematically illustrating a radial cross section of the screw rotor according to the first embodiment.

FIG. 2 schematically illustrates a radial cross section of the male screw rotor 27 and the female screw rotor 28. Take the male screw rotor 27 for example: the hollow portion 110 has a shape extending in the axial direction along the helical shape of the tooth portion 100 and the groove portion 101. An axial side of a bottom portion of the groove portion 101 is formed as a structure that is continuous with a support portion 113 extending from an axial portion 115.

The tooth portion 100 and the groove portion 101 have a predetermined thickness in the axial direction and the thickness is uniform in the axial direction. Accordingly, the cross sections of the hollow portions have the same diameter (same area) in the axial direction. More specifically, the radial distance from an axial side inner portion of a tooth tip of the tooth portion 100 to the axial portion 115 is equal to that in a hollow portion of another tooth groove.

It is preferable that the thickness is thin in terms of reducing the mass and improving the cooling efficiency of the rotor. However, it is important to secure the strength in terms of durability against stress due to pressure and against contact (including galling) between the rotor and another rotor or the inner wall of the bore of the casing.

In this regard, one of the characteristics of the present embodiment is that an axial side of the groove portion 101 (tooth bottom) is connected to the axial portion 115 by the support portion 113. The support portion 113 exerts stress on the groove portion 101 from the axial side toward an outer periphery; and thereby, the structural strength of the tooth portion 100 and the groove portion 101 can be improved.

In addition, one of the characteristics of the present embodiment is that the tooth portion 100, the groove portion 101, the support portion 113, and the axial portion 115 are formed as an integral structure that is continuous in a radial direction and the axial direction.

Here, additive manufacturing using a three-dimensional fabricating apparatus is used to form the continuous and integral structure. As the additive manufacturing, a stereolithography method, a powder sintering additive manufacturing method, an ink jet method, a raw material melting additive method, a gypsum powder method, a sheet molding method, a film transfer image additive method, a metal stereolithography composite processing method, or the like can be applied. In addition, the material of the screw rotor may be resin or metal. Furthermore, the stacking direction may be a horizontal direction, a vertical direction, or an oblique direction with respect to an axis.

Electronic data for the above additive manufacturing is generated by processing three-dimensional data, which is generated by CAD or CG software or a three-dimensional scanner, into NC data using CAM. The data is input into a three-dimensional fabricating apparatus or a cutting RP apparatus to perform three-dimensional fabrication. Incidentally, NC data may be directly generated from three-dimensional data by CAD and CAM software.

In addition, as a method for acquiring three-dimensional data or the like, a data provider or servicer that creates the three-dimensional data or NC data can distribute the data in a predetermined file format via a communication line such as the Internet, and a user downloads the data to a three-dimensional fabricating apparatus, a computer controlling the three-dimensional fabricating apparatus, or the like or makes access to the data using a cloud service. The three-dimensional fabricating apparatus can perform molding for production. Incidentally, it is also possible to adopt a method by which the data provider provides the three-dimensional data or NC data to the user in a state where the three-dimensional data or NC data is stored in a non-volatile storage medium.

One of the characteristics is that according to the above method, the male screw rotor 27 (similarly, also the female screw rotor 28) is made of a raw material such that the tooth portion 100, the groove portion 101, the support portion 113, the end portions 102a and 102b, the axial portion 115, and the shaft portion 106 are chemically bonded to form a continuous and integral structure by the above various three-dimensional fabrication methods. It can be said that in casting molding, for example, the outer periphery can be molded by a mold, but the disposition of a core is very complicated, so that it is very difficult or not feasible to remove the core, and thus it is very difficult to mold the above components continuously and integrally.

In addition, for example, as disclosed in Patent Document 1 at the beginning of the specification, when the male screw rotor 27 (similarly, also the female screw rotor 28) is configured to be split by casting or cutting and welding or joining is to be performed thereon later, the man-hour is increased, for example, due to grinding welded and joined portions. In addition, it can be said that it is difficult to realize a uniform state in bonding the above portions and there remains a problem with strength.

In a screw rotor that is difficult to be molded in three-dimension such as a helical shape, the present embodiment exhibits a remarkable effect of being able to provide a hollow body that can secure strength or improve the cooling performance or can efficiently use kinetic energy by a mass reduction.

Figure 3:
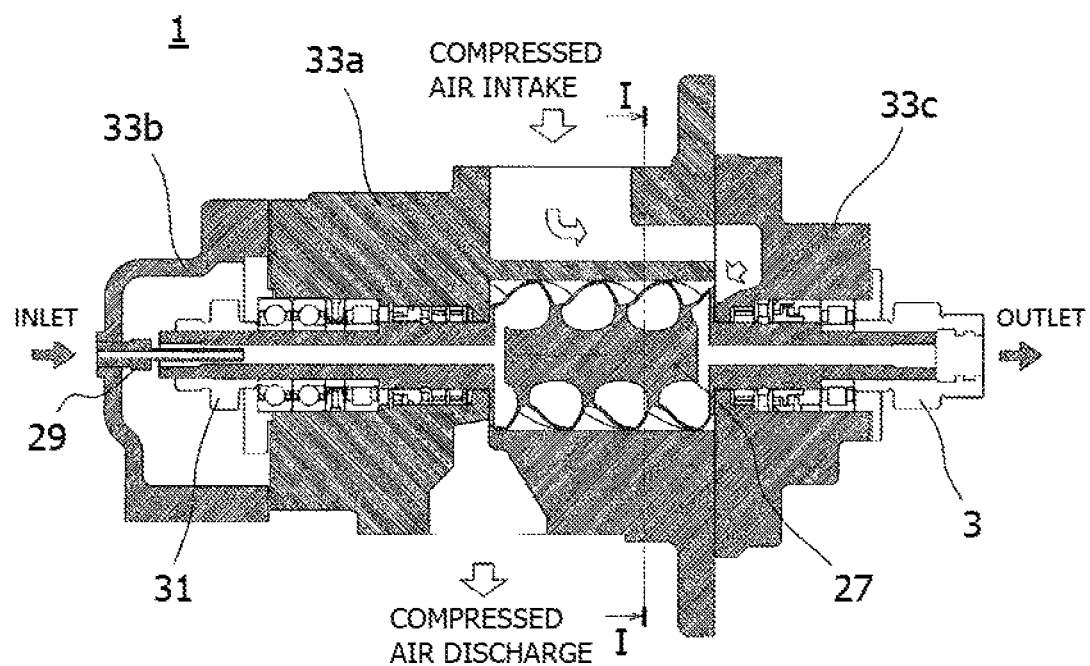
FIG. 3 is an axial longitudinal cross-sectional view of a compressor main body to which the screw rotor according to the first embodiment is applied.

FIG. 3 schematically illustrates an axial longitudinal cross-sectional view of a compressor main body 1 to which the male screw rotor 27 and the female screw rotor 28 are applied. In addition, FIG. 4 schematically illustrates a configuration of a screw compressor 50 including the compressor main body 1.

The compressor main body 1 includes the male screw rotor 27, the female screw rotor 28, the casing main body 33a that stores the screw rotors 27 and 28 to form a plurality of the compression working chambers, and a discharge side casing 33b and an intake side casing 33c that store the shaft portion 106.

The casing main body 33a includes an intake port that suctions air into the compression working chambers, and a discharge port that discharges compressed air generated by the compression working chambers. A pinion gear 3 is connected to a shaft end portion on an intake side of the male screw rotor 27 and is driven by the electric motor 8 which is a drive source, to rotate the male screw rotor 27 and the female screw rotor 28. A structure where the timing gear of male screw rotor 31 and the timing gear of female screw rotor 32 are connected to shaft end portions on a discharge side of the screw rotors 27 and 28 and the rotation of the male screw rotor 27 is transmitted to the female screw rotor 28 by the connection for the male screw rotor 27 and the female screw rotor 28 to rotate synchronously is employed. The compression working chamber reduces the volume to compress air while moving to the discharge side by the rotation.

Figure 4:
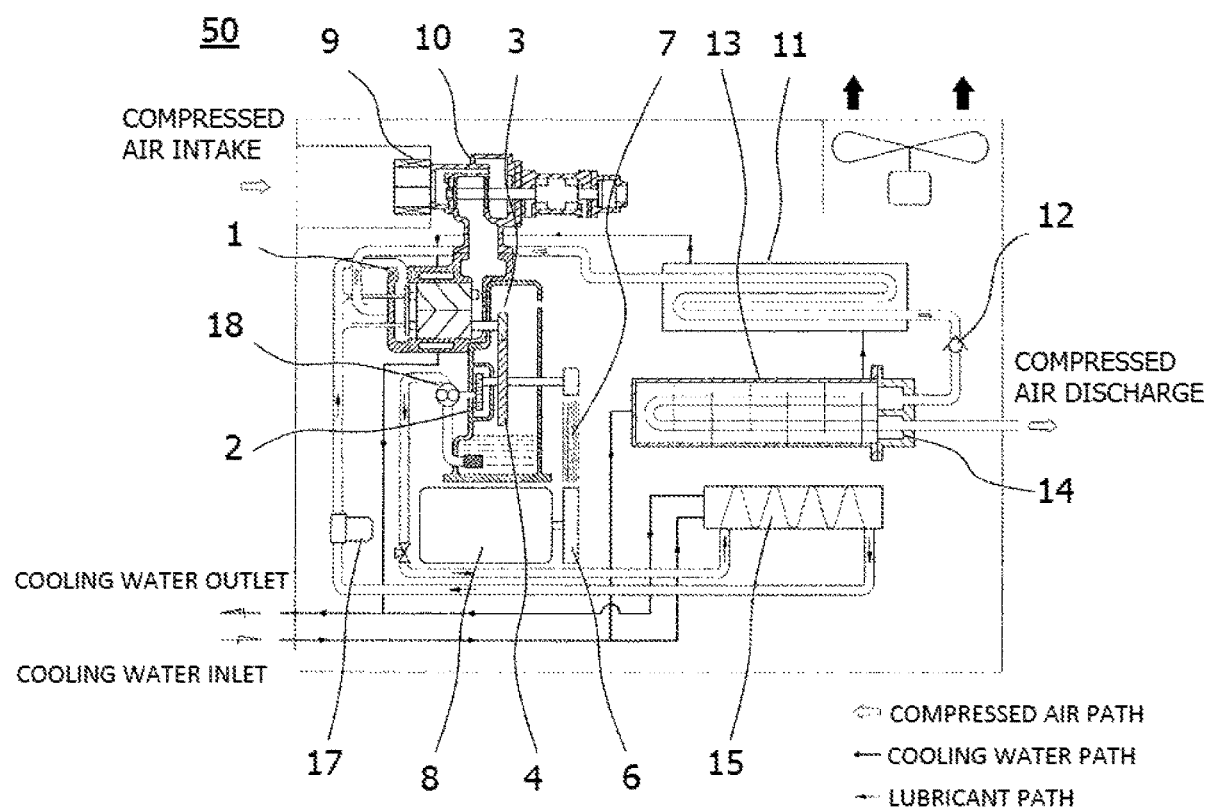
FIG. 4 is a schematic view illustrating a configuration of an air compressor to which the screw rotor according to the first embodiment is applied.
Figure 5:
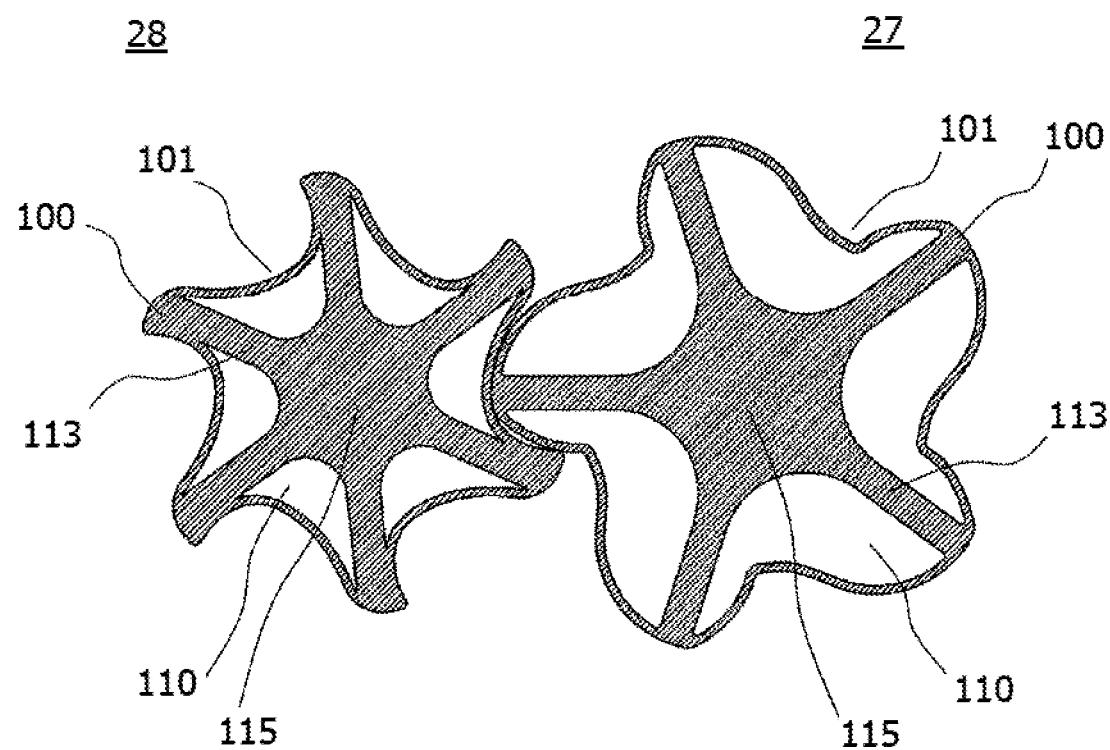
FIG. 5 is a view schematically illustrating a radial cross section of a screw rotor according to a second embodiment to which the invention is applied.

In FIG. 4, the pinion gear 3 connected to the shaft end portion of the male screw rotor 27 meshes with a bull gear 4 attached to one side of an intermediate shaft in a gear casing 2. A pulley 5 is attached to the other side of the intermediate shaft, and a belt 7 as a body transmitting a driving force is mounted on the pulley 5. The belt 7 is also mounted on a pulley 6 attached to a shaft end of the electric motor 8, so that the power of the electric motor 8 is transmitted to the compressor main body 1. Incidentally, as another configuration of a drive mechanism, a gear and a chain may be used other than a combination of the pulley 6 and the belt 7, or the rotor shaft may be directly coupled to an output shaft of the electric motor 8.

An intake throttle valve 10 that regulates the amount of air to be suctioned into the compressor main body 1 is disposed on the intake side of the compressor main body 1. Foreign matter is removed from air by an intake filter 9, the air is suctioned into the compressor main body 1 through the intake throttle valve 10 and is compressed to a predetermined pressure to be discharged from an outlet of the compressor main body. The compressed air discharged from the compressor main body 1 is cooled by a water-cooled precooler 11 provided downstream of the compressor main body 1 and then guided to a water-cooled aftercooler 13 via a check valve 12. The compressed air cooled by the aftercooler 13 is discharged from a compressed air outlet. Here, an air passage in the aftercooler 13 is formed of a U-shape pipe, and inlet and outlet ports of the aftercooler 13 are formed of an integral after cooler header 14.

In the screw compressor 50, a lubricant is used as a cooling medium to lubricate a sliding body and the like. The path of the lubricant is as follows. The lubricant circulates in such a manner that the lubricant stored in an oil sump provided in a lower portion of the gear casing 2 is guided to an oil cooler 15 by an oil pump 16 to be cooled and contaminant or the like is removed from the lubricant by an oil filter 17, and then the lubricant is supplied to a bearing member of the compressor main body 1, the timing gears of screw rotor 31 and 32, the pinion gear 3 and further to a bearing member of the intermediate shaft or the bull gear 4 attached to the intermediate shaft in the gear casing 2 to then return to the oil sump of the gear casing 2. The lubricant flows from a male screw rotor nozzle 29 (female screw rotor nozzle 30 attached to the compressor main body 1 into the hollow portion 110 via the through-portion 111 and the communication portion 112 of each of the rotors 27 and 28 to be used for cooling. A configuration where after having cooled the screw rotors 27 and 28, the lubricant passes through the pinion gear 3, similar to the other lubricant, to be stored in the oil sump in the gear casing 2 and to circulate is employed. Incidentally, the lubricant flows from the discharge side where temperature is high into the intake side; and thereby, higher cooling performance can be obtained; however, the lubricant may flow from the intake side into the discharge side.

As described above, according to the first embodiment, the male screw rotor 27 and the female screw rotor 28 can secure strength while reducing the masses of the rotors, and can secure a rotational energy reduction effect or durability. Furthermore, the cooling medium flows through the hollow portion 110; and thereby, a rise in temperature of the screw rotor can be reduced. The improvement in cooling performance suppresses the thermal deformation of the male screw rotor 27 and the female screw rotor 28, and thus a gap between the screw rotors and between the screw rotors and the inner wall of the bore of the casing main body 33a can be reduced; and thereby, the compression performance can be improved.

In addition, since the thermal deformation of the screw rotors is suppressed, a variation in accuracy of machining the tooth portion or a variation in compression performance occurring during a low load operation can be also reduced. Furthermore, since discharge air temperature can be also reduced, the coolers in the compressor can be reduced or eliminated; and thereby, the cost can be reduced and the entire compressor can be compacted.

In addition, since the screw rotors 27 and 28 each are molded by a three-dimensional fabricating apparatus, in addition to being able to realize complex structures such as the hollow portion 110 having a helical shape, the communication portion 112, and the end portions 102a and 102b, these portions are formed as a continuous and integral structure; and thereby, the strength can be secured.

Second Embodiment

Next, a second embodiment of the invention will be described. Incidentally, the same reference signs are assigned to components common to the first embodiment, and detailed descriptions may be omitted.

FIG. 2 schematically illustrates a radial cross section of the male screw rotor 27 and the female screw rotor 28 in the second embodiment. One of the characteristics of the screw rotor in the second embodiment is that the support portion 113 is formed as an integral structure where the axial side of the tooth portion 100 is continuous with the axial portion 115.

The present embodiment has an advantage that the strength of the tooth tip is particularly increased. Since the tooth tip is convex in the radial direction, when the tooth tip comes into the other rotor or the inner wall of the bore of the casing, as compared to the tooth bottom, the collision force tends to be higher and the degree of collision deformation also tends to be larger.

The present embodiment has an advantage on the problem in terms of strength. Particularly, in the female screw rotor 28 having a smaller tooth width than that of the male screw rotor 27, a better strength advantage can be expected.

The modes for carrying out the invention have been described above; however, the invention is not limited to the above various embodiments, and various modifications or substitutions can be made without departing from the concept of the invention. For example, in the above embodiments, all of the screw rotors forming the compressor main body 1 are hollow; however, only either one screw rotor may be hollow. In addition, the male and female screw rotors of the first embodiment and the male and female screw rotors of the second embodiment can be also combined.

In addition, in the above embodiments, the male screw rotor 27 has five teeth and the female screw rotor 28 has six teeth; however, the number of teeth can be randomly changed depending on application.

In addition, in the above embodiments, an air compressor has been provided as an example of a fluid machine; however, the invention is also applicable to an expander or a pump device. In addition, the compressor is not limited to compressing air, and the compressor may compress other gas. In addition, an oil-free screw compressor has been provided as an example; however, the liquid to be supplied to the compression working chambers may be not only oil but also water or other liquid. In addition, the invention is also applicable to a lubricated screw compressor.

In addition, in the above embodiments, the electric motor has been described as a drive source; however, the drive source may be, for example, an internal combustion engine or other devices that generate a rotational force. Particularly, when the invention is applied to the expander, the expander may be configured such that a generator is provided instead of the electric motor or the electric motor is used as motor generator.

REFERENCE SIGNS LIST

1 Compressor main body
2 Gear casing
3 Pinion gear
4 Bull gear
6 Pulley
7 Belt
8 Electric motor
9 Intake filter
10 Intake throttle valve
11 Precooler
12 Check valve
13 Aftercooler
14 Aftercooler header
15 Oil cooler
16 Oil pump
17 Oil filter 27 Male screw rotor
28 Female screw rotor
29 Male screw rotor nozzle
30 Female screw rotor nozzle
31 Timing gear of male screw rotor
32 Timing gear of female screw rotor
33a Casing main body
33b Discharge side casing
33c Intake side casing
50 Screw compressor
100 Tooth portion
101 Groove portion
102a, 102b End portion
105 Screw portion
106 Shaft portion
110 Hollow portion
111 Through-portion
112 Communication portion
113 Support portion
115 Axial portion

The invention claimed is:

1. A screw rotor having a helical tooth on an outer periphery, the helical tooth extending by a predetermined length in an axial direction,
wherein a radial cross section of the screw rotor includes a cross section of a tooth portion, a cross section of an axial portion, a cross section of a support portion connected to an axial side of a tooth bottom or a tooth tip in the cross section of the tooth portion and an outer diameter side of the axial portion, and a cross section of a hollow portion formed by the support portions adjacent to each other in a rotational direction and an axial side inner surface of the tooth bottom or the tooth tip, and
an axial longitudinal cross section of the screw rotor is a cross section in which the axial portion, the support portion, the axial side of the tooth bottom or the tooth tip, and an axial end portion of the screw rotor are continuously connected to each other as an integral structure, wherein
the screw rotor includes a screw portion, which includes the tooth portion and a groove portion, which have a helical radial outer periphery and end portions on both sides in an axial direction, and a shaft portion disposed at the centers of axial end portions of the screw portion, and
the hollow portion is coaxial with the axial portion.

2. The screw rotor according to claim 1,
wherein an axial thickness of the tooth portion is uniform.

3. The screw rotor according to claim 1,
wherein a radial distance from an axial side inner portion of the hollow portion to an axis of the screw rotor is equal to a radial distance from an axial side bottom portion of another hollow portion to the axis.

4. The screw rotor according to claim 1,
wherein the screw rotor includes at least one male rotor and one female rotor which mesh with each other.

5. The screw rotor according to claim 1,
wherein the screw rotor includes at least one set of a male rotor and a female rotor mesh with each other.

6. The screw rotor according to claim 5,
wherein, of the support portions of one of the at least one male rotor and one female rotor, the support portion of one rotor is connected to the axial side inner surface of the tooth tip.

7. The screw rotor according to claim 1,
wherein the axial end portion includes a through-portion communicating with an outside, and
the hollow portion includes a communication portion communicating with the through-portion.

8. The screw rotor according to claim 7,
wherein the through-portion penetrates through the shaft portion in the axial direction, the shaft portion extending from the axial end portion in the axial direction.

9. The screw rotor according to claim 1,
wherein the axial portion; the support portion, the axial side of the tooth bottom or the tooth tip, and the axial end portion of the screw rotor are formed as an integral structure by a three-dimensional fabrication method.

10. A fluid machine main body comprising:
a screw rotor that is hollow and has a helical tooth; and
a casing of the screw rotor,
wherein a radial cross section of the screw rotor includes a cross section of a tooth portion, a cross section of an axial portion, a cross section of a support portion connected to an axial side of a tooth bottom or a tooth tip in the cross section of the tooth portion and an outer diameter side of the axial portion, and a cross section of a hollow portion formed by the support portions adjacent to each other in a rotational direction and an axial side inner surface of the tooth bottom or the tooth tip, and
an axial longitudinal cross section of the screw rotor is a cross section in which the axial portion, the support portion, the axial side of the tooth bottom or the tooth tip, and an axial end portion of the screw rotor are continuously connected to each other as an integral structure, wherein
the screw rotor includes a screw portion, which includes the tooth portion and a groove portion, which have a helical radial outer periphery and end portions on bath sides in an axial direction, and a shaft portion disposed at the centers of axial end portions of the screw portion, and
the hollow portion is coaxial with the axial portion.

11. The fluid machine main body according to claim 10,
wherein the screw rotor includes at least one male rotor and one female rotor which mesh with each other.

12. The fluid machine main body according to claim 10,
wherein the screw rotor includes at least one set of a male rotor and a female rotor which mesh with each other.

13. The fluid machine body according to claim 12,
wherein, of the support portions of one of the at least one male rotor and one female rotor, the support portion of one rotor is connected to the axial side inner surface of the tooth tip.

14. The fluid machine main body according to claim 10,
wherein the axial end portion includes a through-portion communicating with an outside, and
the hollow portion includes a communication portion communicating with the through-portion.

15. The fluid machine main body according to claim 14,
wherein the through-portion penetrates through the shaft portion in an axial direction, the shaft portion extending from the axial end portion in the axial direction.

16. The fluid machine main body according to claim 10,
wherein the axial portion, the support portion, the axial side of the tooth bottom or the tooth tip, and the axial end portion of the screw rotor are formed as an integral structure by a three-dimensional fabrication method.

17. A fluid machine comprising:
a fluid machine main body including a screw rotor that is hollow and has a helical tooth; and a casing of the screw rotor;
a drive source;
a pipeline that supplies a cooling medium to the screw rotor; and
a pump that pressure-feeds the cooling medium to the pipeline,
wherein a radial cross section of the screw rotor includes a cross section of a tooth portion, a cross section of an axial portion, a cross section of a support portion connected to an axial side of a tooth bottom or a tooth tip in the cross section of the tooth portion and an outer diameter side of the axial portion, and a cross section of a hollow portion formed by the support portions adjacent to each other in a rotational direction and an axial side inner surface of the tooth bottom or the tooth tip,
an axial longitudinal cross section of the screw rotor is a cross section in which the axial portion, the support portion, the axial side of the tooth bottom or the tooth tip, and an axial end portion of the screw rotor are continuously connected to each other as an integral structure,
the axial end portion includes a through-portion communicating with an outside,
the hollow portion includes a communication portion communicating with the through-portion, and
the cooling medium flowing through the pipeline flows through an inside of the screw rotor,
the screw rotor includes a screw portion, which includes the tooth portion and a groove portion, which have a helical radial outer periphery and end portions on both sides in an axial direction, and a shaft portion disposed at the centers of axial end portions of the screw portion, and
the hollow portion is coaxial with the axial portion.

18. The fluid machine according to claim 17,
wherein the through-portion penetrates through the shaft portion in an axial direction, the shaft portion extending from the axial end portion in the axial direction.

19. The fluid machine according to claim 17,
wherein the axial portion, the support portion, the axial side of the tooth bottom or the tooth tip, and the axial end portion of the screw rotor are formed as an integral structure by a three-dimensional fabrication method.

* * * * *